United States Patent [19]

Pitchaikani et al.

[11] Patent Number: 5,684,988
[45] Date of Patent: Nov. 4, 1997

[54] MIB DATABASE AND GENERIC POPUP WINDOW ARCHITECTURE

[75] Inventors: Balaji Pitchaikani, Santa Clara; Chen-Yea Luo, Sunnyvale; Gregory Allen Foster, Santa Clara, all of Calif.

[73] Assignee: Bay Networks, Inc., Santa Clara, Calif.

[21] Appl. No.: 279,494

[22] Filed: Jul. 22, 1994

[51] Int. Cl.$^6$ ........................................... G06F 17/30
[52] U.S. Cl. ............... 395/615; 395/614; 395/348; 395/353; 395/672; 395/673; 370/401
[58] Field of Search ............... 395/600, 200, 395/650, 156; 370/85.6

[56] References Cited

U.S. PATENT DOCUMENTS

| | | | |
|---|---|---|---|
| 5,226,120 | 7/1993 | Brown et al. | 395/200 |
| 5,317,568 | 5/1994 | Bixby et al. | 370/85.6 |
| 5,345,550 | 9/1994 | Bloomfield | 395/156 |
| 5,367,635 | 11/1994 | Bauer et al. | 395/200 |
| 5,432,932 | 7/1995 | Chen et al. | 395/650 |

*Primary Examiner*—Thomas G. Black
*Assistant Examiner*—Cheryl Lewis
*Attorney, Agent, or Firm*—Blakely, Sokoloff, Taylor & Zafman, L.L.P.

[57] ABSTRACT

An apparatus for acquiring a plurality of values from an agent on a network is provided. The apparatus may be accessed through a predefined interface by various network management station applications. Because the apparatus is independent from the network management applications, the functionality provided by the apparatus need not be duplicated in each network management station application. The apparatus generally includes an agent identification unit, a display mechanism, a database access unit, a storage device and an information retrieval unit. The storage device stores a database containing data representing agents, management information bases, objects and attribute groups. When a network management station application requires values from an agent, the network management station application sends the apparatus a signal identifying the agent and specifying an information category, such as performance, status, or diagnostic. The agent identification unit identifies the type of the agent. The database access unit accesses the database to determine a plurality of objects which correspond to the specified information category according to the type of the agent. The information retrieval unit sends an information request to the agent based on the plurality of objects determined by the database access unit, and receives a response containing the plurality of values from the agent. The plurality of values are sent to the display unit, which displays the values visually in a pop-up window.

25 Claims, 6 Drawing Sheets

MIB DATABASE AND GENERIC POPUP WINDOW ARCHITECTURE

BACKGROUND OF THE INVENTION

A network generally includes a number of devices connected to allow inter-device communication. As networks and networked devices become increasingly complex, it becomes increasingly important to be able to monitor the status and performance of networks, and more particularly, to monitor the status and performance of each of the devices on the network. Consequently, most networks include at least one computer workstation responsible for monitoring the network (a "network management station" or "NMS"). Numerous network management station applications ("NMS applications") have been developed which allow network management stations to monitor one or more particular aspects of a network.

To acquire specific information about a given device on the network, a typical NMS application must identify the agent running on the given device, determine the type of information the agent running on the device can supply, transmit to the agent a message requesting the specific information, receive from the agent a message including the specific information, format the received information and generate a visual display of the formatted information. The communications between the NMS and the agent required by this process must be performed according to a protocol, such as the Simple Network Management Protocol (SNMP). SNMP is currently used and supported by most Open System based network devices.

The identity of an agent must be determined before information may be requested from the agent because different agents are capable of providing different information. A request for information that the agent cannot supply may result in an error or in the conveyance of inaccurate information. On the other hand, failure to request information that an agent can supply may result in the conveyance of incomplete information. The more information an NMS application can acquire from an agent, the better the network can be monitored and debugged by a network manager.

One method of identifying an agent is to allow a user to manually enter data to indicate a device, the agent running on the device, and the type of information the agent is capable of supplying. This method has the disadvantage of requiring large amounts of administrative overhead. Further, the network configuration can change once the entities on the network have been manually identified. Thus, the network administrator has the burden of updating the system to reflect each change. Failure to update could result in inaccurate monitoring and complications in debugging.

Once an NMS application identifies an agent, it must determine the information the agent is able to provide about the device on which it is running. The amount of information a given agent can provide depends on the Management Information Bases (MIBs) it supports. A MIB specifies groups of objects, and each object defines a group of data types. An agent supports a MIB if the agent is capable of supplying the type of information defined by the objects specified in the MIB. Most agents can provide the information defined in the objects specified in certain standard MIBs, known as MIB I and MIB II, or non-standard proprietary MIBs. However, even support for these MIBs varies from agent to agent. In addition, each agent may support a subset of a MIB or a different version of a MIB. Finally, many agents have more than one mode. An agent executing in one mode may support different MIBs than the same agent executing in another mode.

Therefore, after an NMS application identifies the type of an agent, the NMS application determines the MIBs supported by that agent. The NMS application may, for example, include a hard-coded mapping between various agents and the MIBs which they support. One disadvantage of such a hard-coded mapping is that an entire new version of each NMS application must be released in order to support later-released agents.

Once the NMS application determines the MIBs supported by the agent, the NMS application determines which objects are specified in the supported MIBs. The objects supported by each MIB may also be hard coded in an NMS application. Alternatively, an NMS application could access a database containing MIBs and inspect the appropriate MIBs to determine the objects specified therein.

After the NMS application determines the objects specified in the MIBs supported by the agent, the NMS application determines which of the objects corresponds to the required information. The NMS application then transmits a request to the agent based upon the appropriate objects, and receives a response from the agent which includes the required information. The NMS application then formats the information and causes the information to be displayed on the network management station.

Most network managers use a variety of NMS applications. For example, a network manager may have one NMS application for generating an inventory of the devices on the network, a second NMS application for displaying the physical connectivity of the network, and a third NMS application for monitoring the traffic on the network. Typically, each one of these NMS applications must implement its own agent identification method, agent-to-MIB mapping function, MIB database access function, and information display function. The need to support these functions substantially increases the complexity and cost of each NMS application. In addition, since the agent-to-MIB mapping function of each NMS application is typically hard coded at the time the NMS application is released, different NMS applications may provide different support for the same agent, depending on the release date of the NMS applications and the agent. Further, since each NMS application must also be aware of which objects correspond to the required information and how the required information must be formatted prior to display, there is also a substantial duplication of data and development between NMS applications.

In light of the foregoing, it is clearly desirable to reduce the functional and data redundancies between NMS applications. Further, it is desirable to provide a single, central database for supplying agent-to-MIB information and MIB content information to a plurality of NMS applications. It is further desirable to provide a mechanism for supplying a specific type of information about a device to an NMS application without requiring that the NMS application be aware of the specifics of the device.

In addition, it is desirable to provide a display mechanism, accessible by a plurality of NMS applications, for formatting and displaying specified information once the information is retrieved from an agent. It is further desirable that the display mechanism be implemented independent of the central database so that the display mechanism need not be revised when the central database is updated. Finally, it is desirable to provide an easy and efficient method for importing information into the central database, so that the central database may be updated to support devices, agents, and MIBs released after the release of the central database.

SUMMARY AND OBJECTS OF THE INVENTION

According to one aspect of the present invention, an apparatus for acquiring a plurality of values from a selected agent on a network is provided. The plurality of values corresponds to a plurality of selected attributes of a device on which the selected agent is running. The selected agent is an agent of a given type. The apparatus includes a storage device, a database access unit, and an information retrieval unit.

The storage device stores a plurality of agent identifiers, a plurality of MIB object identifiers, and a plurality of agent-to-object pointers connecting the plurality of agent identifiers to the plurality of MIB object identifiers. The database access unit is coupled to the storage device. The database access unit receives an agent signal indicative of the given agent. The database access unit also receives a selected attribute signal indicative of the plurality of selected attributes.

The database access unit selects a selected plurality of MIB object identifiers of the plurality of MIB object identifiers responsive to the agent signal, the selected attribute signal and the plurality of agent-to-object pointers. The selected plurality of MIB object identifiers corresponds to a plurality of objects associated with the plurality of selected attributes. The database access unit generates an object identification signal indicative of the plurality of selected MIB object identifiers.

The information retrieval unit is coupled to the database access unit. The information retrieval unit receives the object identification signal from the database access unit. The information retrieval unit transmits an information request over the network to the specified agent responsive to the object identification signal. The information retrieval unit receives a response to the information request over the network from the specified agent. The response includes data indicative of the plurality of values.

According to one aspect of the invention, the database access unit selects the selected plurality of MIB object identifiers by accessing the storage device to determine a selected agent identifier of the plurality of agent identifiers responsive to the agent signal. The selected agent identifier represents the given agent. The database access unit follows a selected plurality of pointers of the plurality of agent-to-object pointers from the selected agent identifier to the selected plurality of MIB object identifiers. The selected plurality of pointers is selected responsive to the selected attribute signal.

According to another aspect of the invention, the apparatus includes an agent identification unit coupled to the database access unit. The agent identification unit receives a selected agent identification signal indicative of the selected agent. The agent identification unit generates the agent signal in response to the selected agent identification signal. More specifically, the agent identification unit transmits a series of queries to the specified agent over the network in response to the selected agent identification signal. The agent identification unit receives a series of responses to the series of queries from the specified agent over the network. The agent identification unit generates the agent signal in response to the series of responses.

According to yet another aspect of the invention, the apparatus includes a display mechanism coupled to the information retrieval unit. The information retrieval unit transmits a value signal indicative of the plurality of values to the display mechanism. The display mechanism generates a visual representation of the plurality of values. The visual representation may be, for example, a pop-up window.

The storage device preferably stores a plurality of syntax identifiers and a plurality of object-to-syntax pointers. The plurality of object-to-syntax pointers connect each MIB object identifier of the plurality of MIB object identifiers to a corresponding syntax identifier of the plurality of syntax identifiers. The database access unit selects a selected plurality of syntax identifiers of the plurality of syntax identifiers responsive to the plurality of object-to-syntax pointers. The selected plurality of syntax identifiers corresponds to the selected plurality of MIB object identifiers. The database access unit generates a syntax signal indicative of the selected plurality of syntax identifiers. The display mechanism is coupled to the database access unit. The display mechanism receives the syntax signal from the database access unit. The display mechanism generates the visual representation responsive to the syntax signal.

According to another aspect of the invention, the visual representation includes a visual indication of a derived value. The display mechanism calculates the derived value based on at least one value of the plurality of values responsive to a formula configuration file.

According to one embodiment of the invention, the storage device stores a plurality of group identifiers. Each group identifier of the plurality of group identifiers represents a predefined attribute category, such as performance, diagnostics, or status. The plurality of agent-to-object pointers includes a set of agent-to-group pointers and a set of group-to-object pointers. The set of agent-to-group pointers connects the plurality of agent identifiers to the plurality of group identifiers. Specifically, the set of agent-to-group pointers connects each agent identifier of the plurality of agent identifiers to one or more corresponding group identifiers of the plurality of group identifiers. The set of group-to-object pointers connects the plurality of group identifiers to the plurality of MIB object identifiers. Specifically, the set of group-to-object pointers connects each group identifier of the plurality of group identifiers to a corresponding set of MIB object identifiers. Each MIB object identifier in the corresponding set of MIB object identifiers of a given group identifier corresponds to the predefined attribute category represented by the given group identifier.

The selected attribute signal indicates the plurality of selected attributes by specifying a specified predefined attribute category. The database access unit selects the selected plurality of MIB object identifiers by accessing the storage device to determine a selected agent identifier of the plurality of agent identifiers responsive to the agent signal. The selected agent identifier represents the given agent. The database access unit follows a selected pointer of the set of agent-to-group pointers from the selected agent identifier to a selected group identifier of the plurality of group identifiers responsive to the agent signal. The selected group identifier corresponds to the specified predefined attribute category. The database access unit selects the corresponding set of MIB object identifiers of the selected group identifier as the selected plurality of MIB object identifiers.

According to another aspect of the invention, the agent identification unit is coupled to the display mechanism. The display mechanism is coupled to receive the selected attribute signal and a selected agent identification signal from a network management station application unit. The selected agent identification signal is indicative of the selected agent. The display mechanism transmits the selected attribute signal to the database access unit and the selected agent identification signal to the agent identification unit. The agent identification unit generates the agent signal in response to the selected agent identification signal. The agent identification unit transmits the agent signal to the database access unit through the display mechanism.

According to another aspect of the invention, the apparatus includes an import unit coupled to the storage device. The import unit receives an import script file. The import unit constructs a new identifier based on the import script file and stores the new identifier on the storage device. The new identifier may be either an agent identifier, a group identifier, or an MIB object identifier. The import unit adds the new identifier to the plurality of agent-identifiers if the new identifier is an agent identifier, adds the new identifier to the plurality of group identifiers if the new identifier is a group identifier, and adds the new identifier to the plurality of MIB object identifiers if the new identifier is an MIB object identifier. Preferably, the import script file is a user-modifiable text file.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENT

Figure 1:
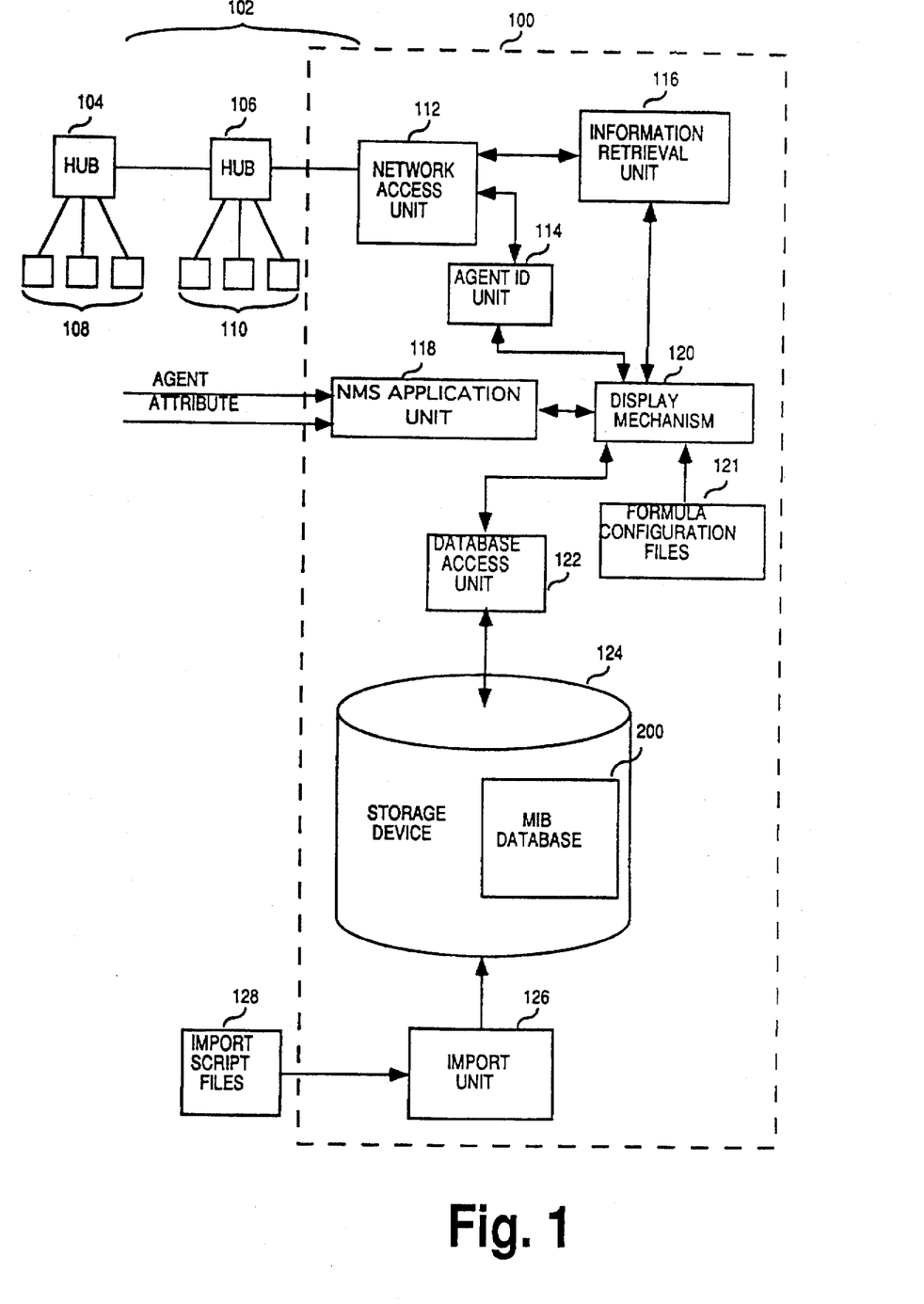
FIG. 1 is a block diagram illustrating a network management station according to one embodiment of the present invention.

Referring now to FIG. 1, it illustrates in block diagram form a network management station 100 configured to monitor a network system 102 according to one embodiment of the invention. Network system 102 generally includes a plurality of hubs 104 and 106. Hub 104 is connected to a plurality of devices 108, and hub 106 is connected to a plurality of devices 110. Hub 106 is also connected to network management station 100.

Network management station 100 generally includes a network access unit 112, an agent identification unit 114, an information retrieval unit 116, an NMS application unit 118, a display mechanism 120, a database access unit 122, a storage device 124, a plurality of formula configuration files 121 and an import unit 126. The operation of network management station 100 shall now be described with reference to FIG. 5.

Figure 5:
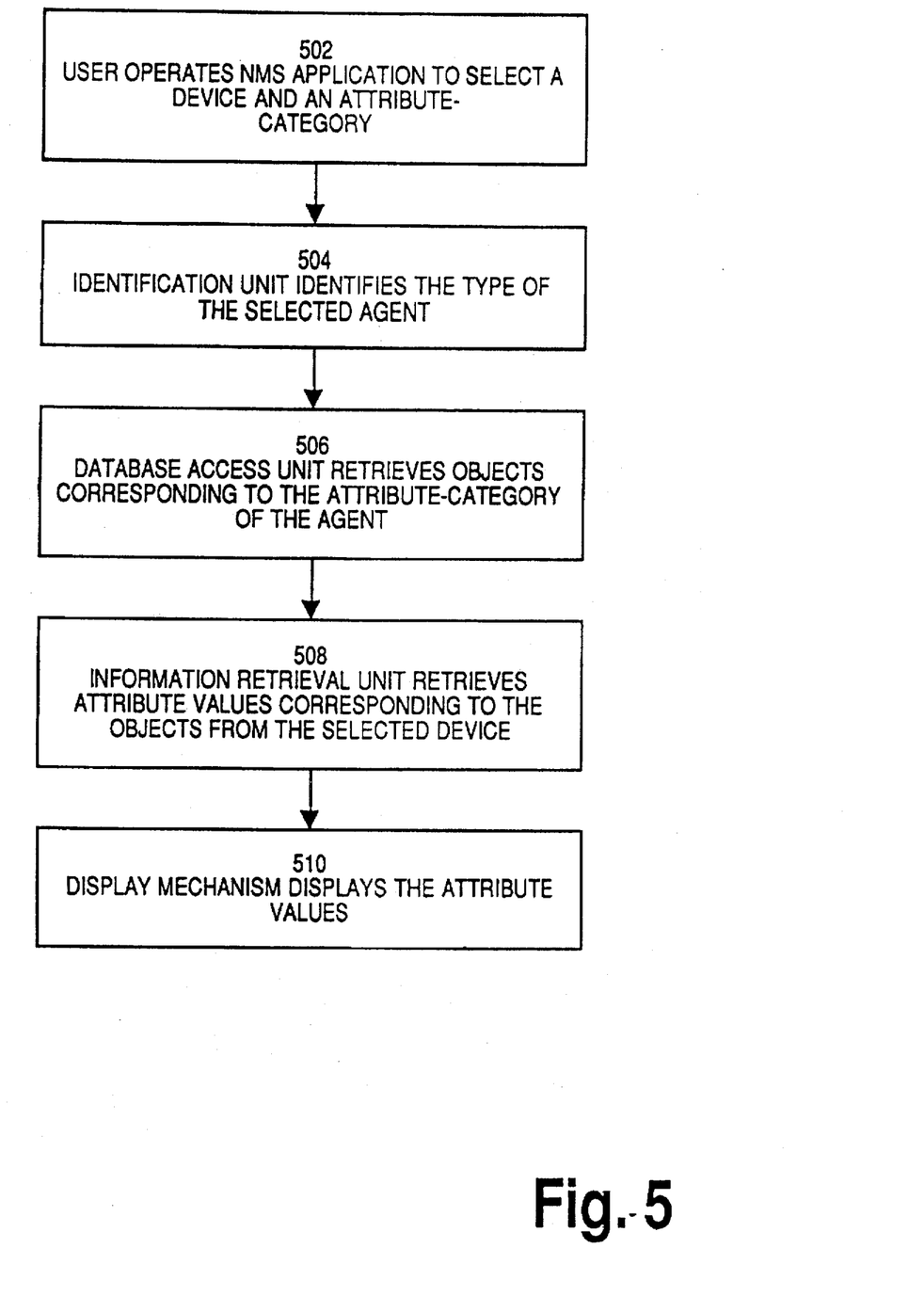
FIG. 5 is a flow chart of a method for displaying selected attributes of a selected device according to an embodiment of the invention.

NMS application unit 118 represents a circuit or processor configured to execute an NMS application. Preferably, the NMS application running on NMS application unit 118 allows a user to select an agent running on a device in network system 102 and to select an attribute-category of the device, as shown in step 502. An attribute-category is a general information category such as diagnostic information, status information, or performance information. In the following description, it shall be assumed that a user has instructed NMS application unit 118 to display the performance of hub 106.

In the preferred embodiment, the NMS application need not be aware of the type of the selected agent, the kind of information the selected agent is able to provide, or the specific attributes of the selected agent which belong to the category identified by the selected attribute-category. Specifically, in the present example, NMS application unit 118 need not know what type of agent is running on hub 106, what type of information the agent running on hub 106 can provide, nor what attributes of hub 106 constitute performance information. In response to a user's request to display the performance attributes of hub 106, NMS application unit 118 transmits a signal to display mechanism 120 identifying the selected agent (hub 106) and the selected attribute-category (performance).

Display mechanism 120 generally represents a circuit or processor configured to execute an agent display program. An agent display program is a series of instructions which cause the generation of a visual display of one or more values of an agent. Preferably, NMS applications running on NMS application unit 118 communicate with the agent display program running on display mechanism 120 through a standard, predefined interface. Display mechanism 120 receives the signal indicating the required agent and the required attribute-category from NMS application unit 118 through the predefined interface, and transmits a signal indicating the network agent to agent identification unit 114.

Agent identification unit 114 generally represents a circuit or processor configured to identify the type of the required agent, as shown in step 504. For example, agent identification unit 114 may determine that the agent on hub 106 is an agent of type X. In the preferred embodiment of the invention, agent identification unit 114 is a processor programmed to determine the type of the required agent by accessing a network device connectivity database, such as the database described in U.S. patent application Ser. No. 08/279,196 entitled "An Apparatus and Method for Providing Topology Information about a Network", filed on equal day herewith, the content of which is incorporated herein by reference. Preferably, agent identification unit 114 acquires information to construct and maintain the network device connectivity database by performing the agent identification process described in U.S. patent application Ser. No. 08/279,491, entitled "Method and Apparatus for Identifying an Agent Running on a Device in a Computer Network", filed on equal day herewith the content of which is also incorporated herein by reference.

Once agent identification unit 114 has determined the type of the required agent (the "required agent"), agent identification unit 114 sends an agent signal indicative of the required agent back to the display mechanism 120. For example, agent identification unit 114 sends display mechanism 120 an agent signal indicating that the required agent type is agent X. In response to the agent signal from agent identification unit 114, display mechanism 120 sends a signal indicative of the required attribute-category and a signal indicative of the required agent to database access unit 122.

Database access unit 122 generally represents a circuit or processor configured to retrieve objects indicative of the attributes which correspond to the required attribute-category for the required agent (the "selected attributes")

from a MIB database 200 stored on storage device 124 in response to the signals from display mechanism 120, as illustrated by step 506. In the present example, database access unit 122 accesses database 200 to determine which attributes of agent X are performance attributes, and returns objects corresponding to the performance attributes of agent X. For example, database access unit 122 may determine that objects A and C relate to performance attributes of agent X.

When database access unit 122 has determined that objects A and C correspond to the performance attributes of the agent X, the required agent, database access unit 122 transmits data indicative of objects A and C, and the syntax for displaying values corresponding to objects A and C, to display mechanism 120. The objects which correspond to the selected attributes shall be referred to hereafter as the required objects. Display mechanism 120 transmits a signal indicative of the required agent and a signal indicative of the required objects to information retrieval unit 116.

In response to the signals from the display mechanism 120, information retrieval unit 116 retrieves values corresponding to the required objects from the selected device, as shown in step 508. Specifically, information retrieval unit 116 transmits, through network access unit 112, an information request to the required agent. The information request indicates which information is requested by identifying the required objects. In response to the information request, the required agent transmits the values of the attributes corresponding to the required objects to information retrieval unit 116 through network access unit 112. In the present example, information retrieval unit 116 transmits a request specifying objects A and C, and the agent on hub 106 responds with a signal specifying values corresponding to objects A and C. Information retrieval unit 116 retrieves the values of the selected attributes from the required objects and transmits the values to display mechanism 120.

Display mechanism 120 formats the values based on the syntax information received from database access unit 122 and displays the retrieved values in a pop up window, as shown in step 510. As will be discussed in greater detail below, display mechanism 120 may display derivative values specified in formula configuration files 121, in addition to or instead of the retrieved values. Display mechanism 120 may also transmit the values to the NMS application.

Import unit 126 generally represents a circuit or processor configured to update database 200 based on human-readable import script files 128. The specific process by which import unit 126 updates database 200 shall be described in greater detail below.

As is evident by the foregoing discussion, the function of identifying the type of a required agent is performed by agent identification unit 114. The function of determining the specific objects required to retrieve the appropriate values from the specified agent to service a particular request is performed by database access unit 122 based on the information stored in database 200. The function of retrieving the values from the required agent is performed by information retrieval unit 116. Finally, the function of formatting and displaying the retrieved values is performed by display mechanism 120. Since these functions are performed by units separate from NMS application unit 118, the NMS applications need not include code to perform these functions. Rather, the NMS applications need only be capable of communicating with display mechanism 120 through the predetermined interface. As a result, the functional and data redundancy between various NMS applications is significantly reduced. Further, the complexity and cost of developing each NMS application is significantly reduced.

Figure 2:
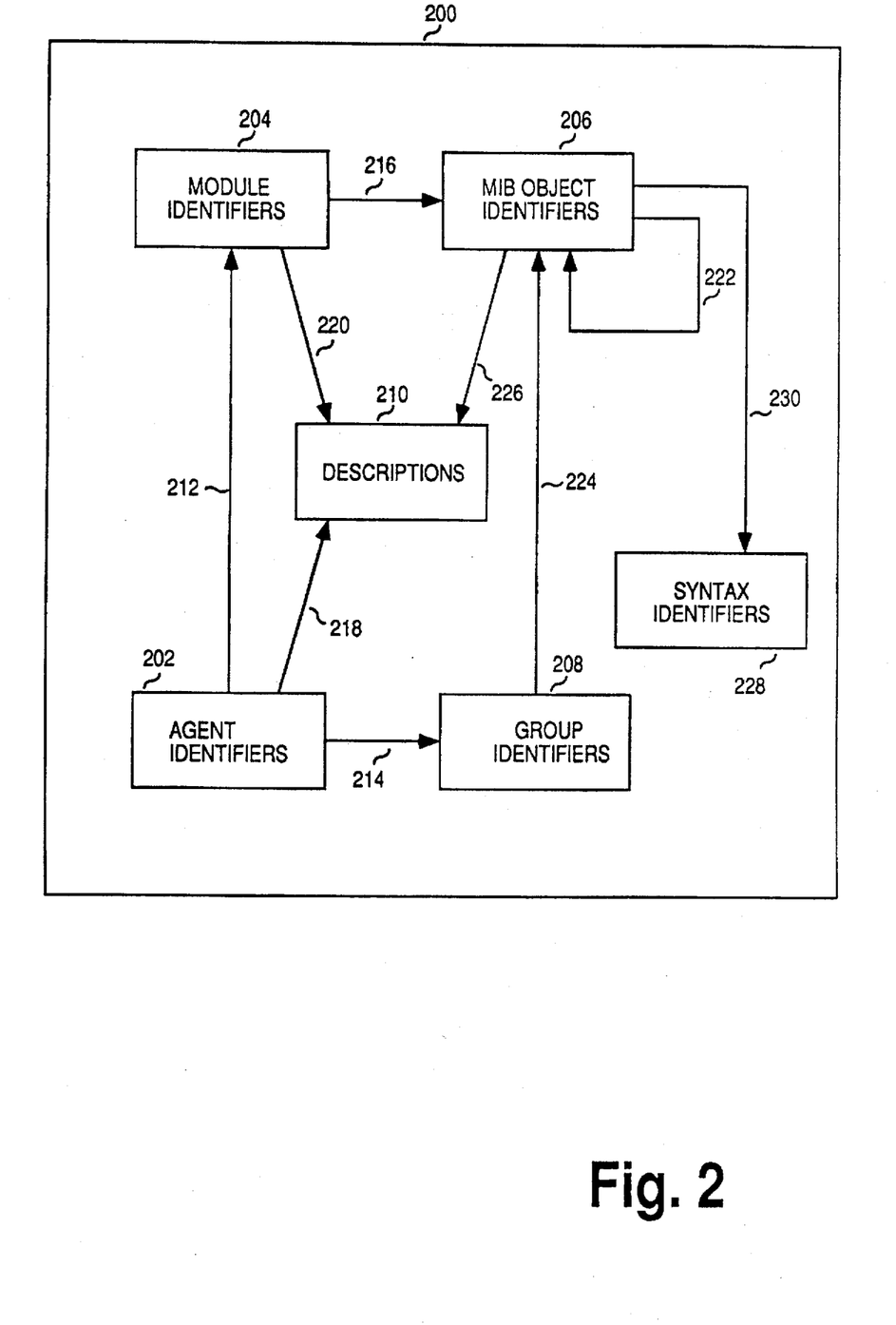
FIG. 2 is a block diagram illustrating the core records and pointers in a database for use in a network management station according to an embodiment of the present invention.

Referring now to FIG. 2, it illustrates in block diagram form a database 200 according to one embodiment of the invention. Database 200 is stored on storage device 124, accessed by database access unit 122, and updated by import unit 126. The content of database 200 shall first be discussed. Once the content of database 200 has been described, the functions performed by database access unit 122 and import unit 126 shall then be discussed in greater detail.

Database 200 generally includes a plurality of agent identifiers 202, a plurality of module identifiers 204, a plurality of MIB object identifiers 206, a plurality of group identifiers 208 and a plurality of descriptions 210. Each agent identifier of agent identifiers 202 identifies a specific agent. Preferably, agent identifiers 202 include an agent identifier for all existing agents. Each module identifier of module identifiers 204 identifies a specific MIB. Preferably, module identifiers 204 include an identifier for all MIBs supported by any agent represented in agent identifiers 202.

Each MIB object identifier of MIB object identifiers 206 identifies an object. An object is a data structure for storing values for predetermined types of information. The data structure of an object may include a plurality of data types as well as other objects. Each group identifier of group identifiers 208 identifies a specific object group. An object group includes one or more objects identified in MIB object identifiers 206. Each description of descriptions 210 is a textual description of either an agent represented in agent identifiers 202, a module represented in module identifiers 204, or an object represented in MIB object identifiers 206.

Each agent identifier of agent identifiers 302 is linked to one or more module identifiers of module identifiers 204. These links are generally represented by an arrow 212. Specifically, an agent identifier of agent identifiers 202 which identifies a given agent is linked to all of the module identifiers of module identifiers 204 which identify MIBs supported by the given agent. For example, if agent X supports MIB A, MIB B, and MIB C, then the agent identifier of agent identifiers 202 which identifies agent X will be linked to the module identifier in module identifiers 204 which represents MIB A, to the module identifier of module identifiers 204 which represents MIB B, and to the module identifier of module identifiers 204 which represents MIB C. The agent identifier for agent X is also linked to a description of descriptions 210 which contains a description of agent X.

The agent identifier for agent X is also linked to one or more group identifiers of group identifiers 208. Each group identifier of group identifiers 208 represents the group of attributes which correspond to a particular attribute-category for a particular agent. For example, a group identifier of group identifiers 208 may identify the attributes of agent X which correspond to performance.

An agent identifier of agent identifiers 202 representing a given agent is linked to all of the group identifiers of group identifiers 208 which identify attribute groups of the given agent. For example, the agent identifier that identifies agent X may be linked to a group identifier which identifies the performance attributes of agent X, to a group identifier which identifies the status attributes of agent X, and to a group identifier that identifies the diagnostic attributes of agent X.

As explained above, each module identifier of module identifiers 204 represents a MIB. Each MIB represents a group of objects. A module identifier of module identifiers 204 which represent a given MIB is linked to all of the MIB object identifiers of MIB object identifiers 206 which represent objects contained in the given MIB. These links are generally shown by an arrow 216. For example, a MIB Q may contain objects X, Y and Z. Therefore the module identifier of module identifiers 204 which represents MIB Q will be linked to the MIB object identifier of MIB object identifiers 206 which represents object X, to the MIB object identifier of MIB object identifiers 206 which represents object Y, and to MIB object identifier of MIB object identifiers 206 which represents object Z.

Each module identifier of module identifiers 204 is also linked to a description of descriptions 210. These links are generally represented by an arrow 220. The description with which a given module identifier is linked contains a description of the MIB represented by the given module identifier.

Each MIB object identifier of MIB object identifiers 206 is linked to a description of descriptions 210. The description to which a given MIB object identifier is linked is a description of the object represented by the given MIB object identifier. Some objects may simply be variations of other objects. Preferably, MIB object identifiers 206 does not store the complete data structure of each variation. Instead, the MIB object identifier of a given object may be linked to the MIB object identifiers which represent variations of the given object. These links are generally shown by an arrow 222. As a result, the MIB object identifier identifying a base object may contain the entire data structure of the base object, while the MIB object identifiers representing variations of the base object need only contain an indication of the differences between the base object data structure and the variation. Consequently, the data redundancy between MIB object identifiers 206 is reduced. The data redundancy reduction may lead to a considerable reduction in the amount of storage space database 200 requires on storage device 124.

Each object identified by an MIB object identifier of MIB object identifiers 206 has a predetermined syntax. The syntax of an object is the data type of the values corresponding to that object. The MIB object identifier of MIB object identifiers 206 of a given object is linked to the syntax identifier of syntax identifiers 228 which identifies the syntax of the given object. These links are generally represented by an arrow 230. For example, a physical address may be represented by an eight character ASCII string. Thus, the MIB object identifier representing the physical address object would be linked to a syntax identifier representing an eight character ASCII string. A syntax identifier may specify, for example, an integer, a string of ASCII characters having a specified minimum length and maximum length, or a real number.

As mentioned above, each group of group identifiers 208 identifies an attribute group for a given agent. Each of the attributes identified in a group identifier corresponds to an object supported by the given agent. Each group identifier of group identifiers 208 is linked to the MIB object identifiers of MIB object identifiers 206 which contain the data structure for the attributes specified in the group identifier. For example, a group identifier may specify that attributes A, B and C represent performance for an agent Y. That group identifier will be linked to the MIB object identifier of MIB object identifiers 206 which contains the data structure corresponding to attribute A, the MIB object identifier of MIB object identifiers 206 which contains the data structure corresponding to attribute B, and the MIB object identifier of MIB object identifiers 206 which contains the data structure which corresponds to attribute C.

Now that the content of database 200 has been described, the process by which database access unit 122 processes the information contained in database 200 shall now be described. As mentioned above, display mechanism 120 transmits a signal indicative of a required agent and either a required attribute-category to database access unit 122. In response, database access unit 122 accesses database 200 on storage device 124 to determine the agent identifier of agent identifiers 202 which identifies the required agent. In the present example, it shall be assumed that the required agent was agent X, and the selected attribute group was performance.

Database access unit 122 determines the agent identifier which identifies agent X. Once the agent identifier for agent X has been identified, database access unit 122 follows the pointer which links the agent identifier for agent X to the group identifier of group identifiers 208 which specifies the performance attributes of agent X. Once the appropriate group identifier has been determined, database access unit 122 follows the pointers from the appropriate group identifier to MIB object identifiers 206. Specifically, the performance group identifier for agent X is linked to the MIB object identifiers which identify the objects corresponding to the performance attributes for agent X. Database access unit 122 follows the pointers from the performance group identifier for agent X to the MIB object identifiers which identify the objects corresponding to the performance attributes for agent X.

Once the appropriate MIB object identifiers have been determined, database access unit 122 follows the pointers from the determined MIB object identifiers to the corresponding syntax identifiers of syntax identifiers 228. The corresponding syntax identifiers indicate to database access unit 122 the syntax of the performance attributes. Database access unit 122 transmits this syntax information to display mechanism 120, and a signal indicative of the objects corresponding to the performance attributes of agent X (the "required objects") to information retrieval unit 116 through display mechanism 120. Display mechanism 120 also transmits a signal indicative of the specified agent to information retrieval unit 116. Information retrieval unit 116 transmits a request for values corresponding to the required objects over network system 102 to the specified agent.

In response to the request signal, the specified agent retrieves values from the device on which the specified agent is running which correspond to the required objects, and transmits a signal containing the retrieved values to information retrieval unit 116. Since the required objects identified in the signal sent to the specified agent correspond to performance attributes, the values supplied by the agent are the present values of those performance attributes. The specified agent transmits the performance values back to the information retrieval unit 116 over network system 102. Information retrieval unit 116 then supplies display mechanism 120 with the values for the performance attributes.

Consequently, display mechanism 120 receives performance values from information retrieval unit 116, and syntax information for the performance values from database access unit 122. Based on the syntax information, display mechanism 120 formats and displays the performance values without having to be aware of the meaning of the attributes which it is displaying. For example, the syntax information may indicate that a value is an integer. Display mechanism 120 receives the value from information retrieval unit 116 and displays the value as an integer.

Figure 3:
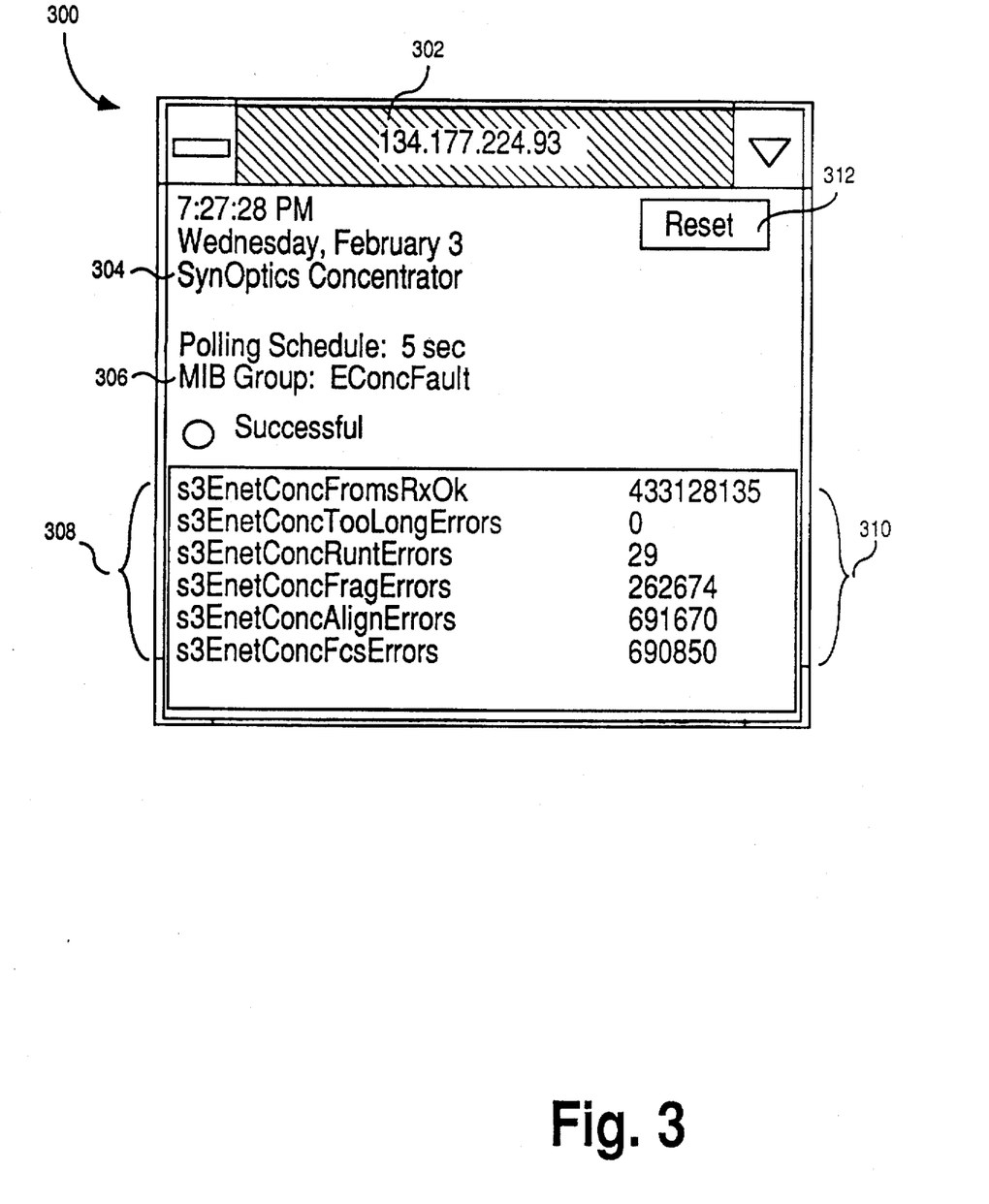
FIG. 3 illustrates a pop-up window generated by a display mechanism according to an embodiment of the present invention.

FIG. 3 illustrates a pop-up window 300 generated by display mechanism 120 according to one embodiment of the invention. Pop-up window 300 visually displays the values corresponding to attributes in a selected attribute group of a selected network device. The identity of the selected network device is identified by a numeric code 302. The device-type of the selected device is visually depicted by a textual device description 304. The name of the required attribute-category is visually depicted by a textual attribute-category description 306. Each attribute belonging to the selected attribute group is visually depicted by textual attribute identifiers 308. The actual values corresponding to each of the attributes is visually depicted by a numeric value display 310 alongside its corresponding textual attribute identifier. Pop-up window 300 also includes the visual depiction of a reset button 312 which may be selected through operation of a user interface device such as a mouse (not shown). Upon selection of reset button 312, display mechanism 120 causes information retrieval unit 116 to retrieve values from the required agent for the attributes in the required attribute-category. When display mechanism 120 receives the new values from the information retrieval unit 116, it updates the numeric value display 310 to reflect the new values.

In the preferred embodiment, display mechanism 120 may be configured to display derivative values in addition to or instead of the retrieved raw values. For example, one performance attribute may be the total number of messages an agent has sent and another performance attribute may be the period of time in which the agent has been active. A network administrator may be interested in the rate at which the agent has been transmitting messages. The message transmission rate of an agent may be derived by dividing the total amount of messages sent by the agent by the amount of time that the agent has been active. Display mechanism 120 may therefore be configured to divide the total message value by the active time value to derive the transmission rate value, and then to display the transmission rate value.

However, display mechanism 120 preferably operates entirely independent from the meaning of the values which it displays. By maintaining this separation, the display mechanism code does not have to be updated in response to changes in the network, changes in database 200, or changes in the content of the information display mechanism 120 displays. However, to display a derivative attribute, display mechanism 120 must be able to calculate the derived value, and therefore be aware of which values the derived value is calculated from.

To both provide support for the display of derived values and maintain the independence of display mechanism 120 from the meaning of the information which it displays, the information for calculating derived attributes is maintained in formula configuration files 121 separate from the display mechanism code. A formula configuration file is a file which indicates a formula to calculate a derived value, and specifies the attributes which correspond to the variables in the formula. Display mechanism 120 retrieves a formula configuration file from formula configuration files 121, performs the calculations specified in the formula configuration file to calculate one or more derived attributes, and displays the derived attributes. By maintaining the derivative attribute calculation information in formula configuration files separate from the display mechanism cede, the display mechanism code remains independent from the meaning of the information it displays. In addition, a user may customize the displays generated by display mechanism 120 without modification to the display mechanism cede itself simply by creating or revising formula configuration files.

Import unit 126 is configured to update database 200 based on a plurality of import script fries 128. Import script fries 128 are preferably human-readable text files. Import script fries 128 include MIB files, "directive" files and MIB group script files.

A MIB file contains information about a certain MIB, including the other MIBs required by the MIB, a description of the MIB, the objects contained in the MIB, and the description and syntax for the objects contained in the MIB. Upon reading a MIB file, import unit 126 updates module identifiers 204, MIB object identifiers 206, descriptions 210, syntax identifiers 228, and links 216, 220, 222, 226 and 230. Specifically, import unit creates a module identifier to identify the MIB described in the MIB file and adds the module identifier to module identifiers 204.

Import unit 126 creates a description of the MIB based on the description in the directive file and adds the description to descriptions 210. Import unit 126 links the new module identifier to the new description. Import unit 126 also creates an MIB object identifier for each of the objects identified in the MIB file. Import unit adds these MIB object identifiers to MIB object identifiers 206 and links the new module identifier to the new MIB object identifiers. Import unit 126 creates a description of each new object and a syntax identifier for each new object based on the information contained in the MIB file, and adds the new descriptions to descriptions 210 and the new syntax identifiers to syntax identifiers 228. Import unit 126 links each of the new MIB object identifiers to its corresponding description and syntax identifier. Import unit 126 also updates variation links 222 to indicate the variation relationships within the new MIB object identifiers, and between the new MIB object identifiers and the pre-existing MIB object identifiers 206.

A directive file contains a list of the MIBs supported by a given agent. Upon reading an directive file, import unit 126 creates an agent identifier for the given agent and adds the new agent identifier to agent identifiers 202. Import unit 126 then links the new agent identifier to the module identifiers of module identifiers 204 which represent the MIBs listed in the directive file.

A MIB group script file contains entries for various types of devices. Each entry has one or more attribute group sections. For example, an MIB group script file entry for a device-type X may have an attribute group section for status attributes, an attribute group section for diagnostic attributes, and an attribute group section for performance attributes. Each attribute group section includes an attribute group name, a list of the agents which can run on the specified device-type, and a list of the object-identifiers which correspond to the attributes belonging to the attribute group. The attribute group section may also list one or more derived attributes. For each derived attribute, the attribute group section contains the name of a file containing the formula used to derive the attribute.

Upon reading an attribute group section in the entry for a given device in a MIB group script file, import unit 126 creates a group identifier identifying the attribute group and adds the new group identifier to group identifiers 208. The import unit 126 then links the new group identifier to the MIB object identifiers of MIB object identifiers 206 which correspond to the objects listed in the attribute group section. The import unit 126 also links the new group identifier with the agents listed in the attribute group section.

By the processes described above, import unit 126 maintains and updates database 200 to provide support for new agents, new MIBs, and new attribute groupings. Because database 200 is updated based on files that are stored and revised separately from the code for database access unit 122 and import unit 126, the code for database access unit 122 and import unit 126 do not need to be revised to provide support for new agents, new MIBs, and new attribute groupings.

Figure 4A:
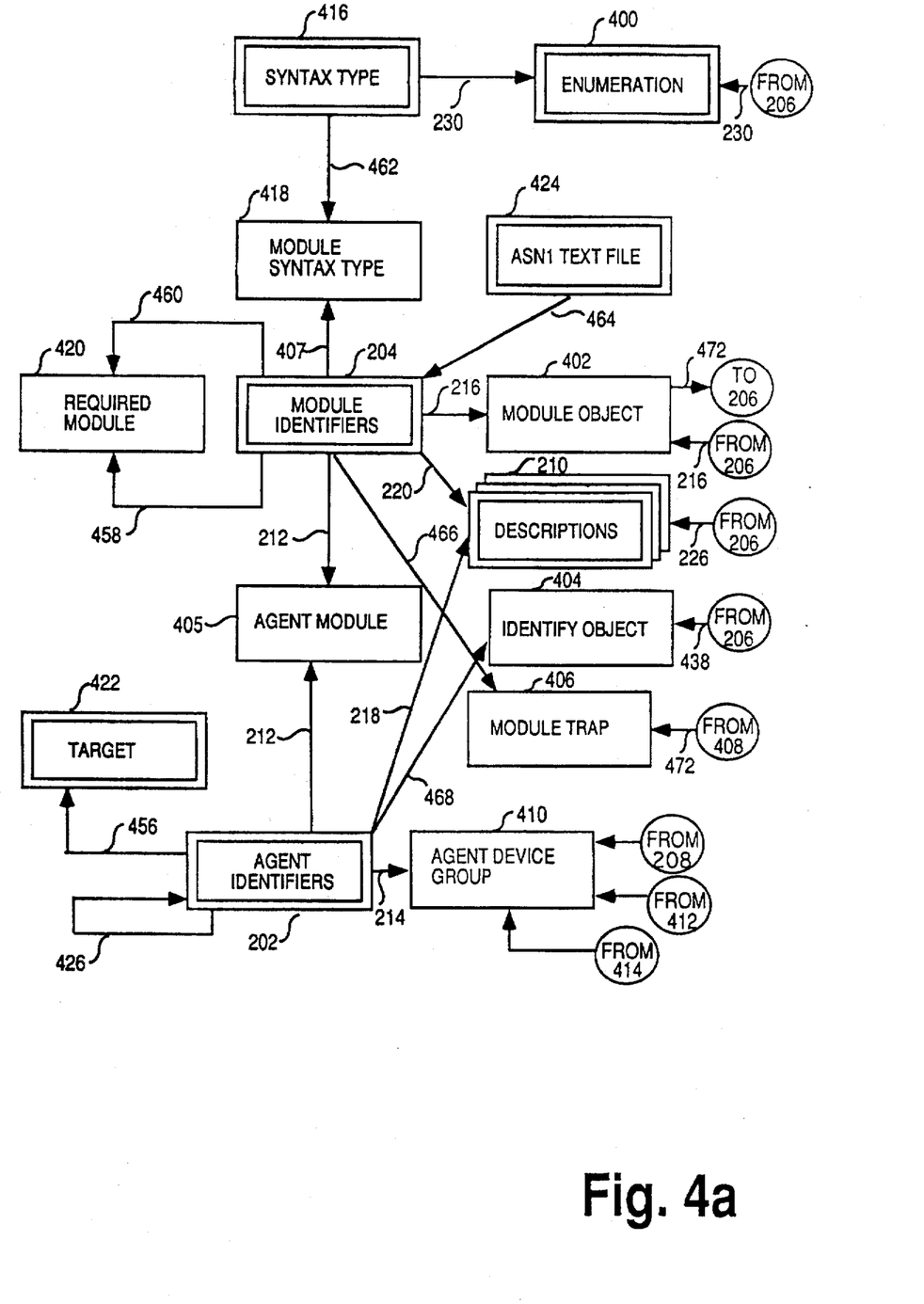
FIGS. 4a and 4b are block diagrams illustrating a database for use in a network management station according to an embodiment of the present invention.
Figure 4B:
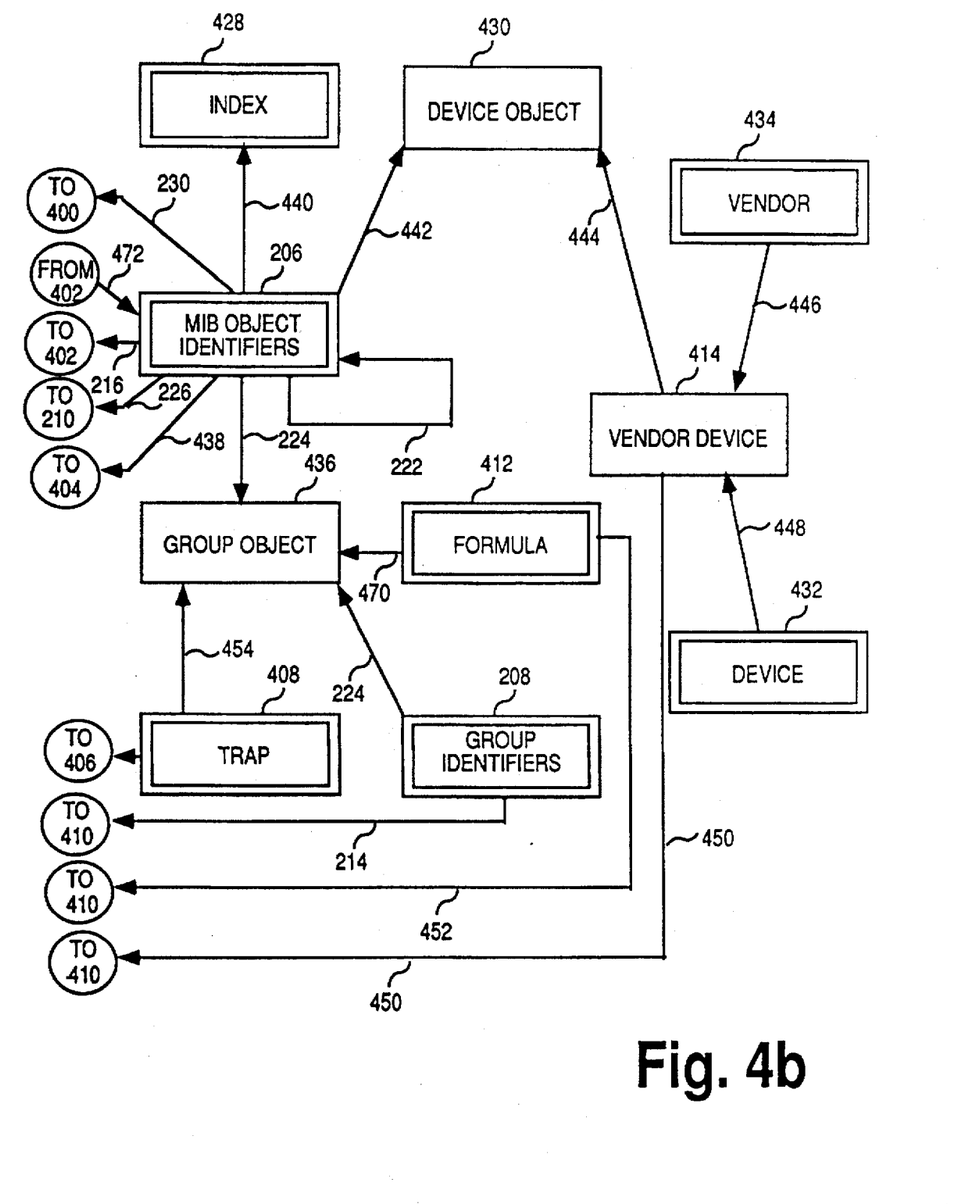

In the preferred embodiment, database 200 is a portion of a larger database 400, as illustrated in FIGS. 4a and 4b. Database 400 includes a plurality of database records, intermediate database records, and links. A database record is data representing values corresponding to a predefined field. Database records are represented in FIGS. 4a and 4b by double-frame blocks. An intermediate database record provides the many-to-many relationship mapping between records in the database that actually store the data. Intermediate database records are represented in FIGS. 4a and 4b by single frame blocks. Links are data associated with one database record which indicate or point to another database record. Links are represented in FIGS. 4a and 4b by arrows.

The various database records, intermediate database records, and links stored in database 400 are descrived below in Table 1.

TABLE 1

| NO. | NAME | DESCRIPTION |
| --- | --- | --- |
| 202 | Agent Identifiers | Contains agent (firmware) related information e.g. agent name, agent version number . . . |
| 204 | Module Identifiers | Contains (MIB) module information e.g. module (file) name, module version number . . . |
| 206 | MIB Object Identifiers | Contains (MIB) object definition e.g. MIB object name, alias name, data type . . . |
| 208 | Group Identifiers | contains MIB grouping definition e.g. (MIB) group name, access flag . . . |
| 210 | Description | Common record linked by Agent, Module MIB Object identifiers for storing detail description of identifiers |
| 400 | Enumeration | Contains MIB object's possible enumeration values |
| 402 | Module Object | Intermediate record to create many-to-many relationship between Module and MIB Object identifiers |
| 404 | Identify Object | Intermediate record to Create many-to-many relationship between Agent and MIB Object identifiers for agent identification |
| 405 | Agent Module | Intermediate record to create many-to-many relationship between Agent and Module identifiers |
| 406 | Module Trap | Intermediate record to create many-to-many relationship between Module and Trap identifiers |
| 408 | Trap | Contains SNMP trap information e.g. trap name, trap number |
| 410 | Agent Device Group | Intermediate record to create many-to-many relationship between Agent, Vendor-Device and Group identifiers |
| 412 | Formula | Contains formula syntax per Group-Object e.g. "(x = 50)/100" |
| 414 | Vendor Device | Intermediate record to create many-to-many relationship between Vendor and Device identifiers |
| 416 | Syntax Type | Contains derived data type of MIB Object identifier e.g. Display string . . . |
| 418 | Module Syntax Type | Intermediate record to create many-to-many relationship between Module and MIB Object identifiers |
| 420 | Required Module | Intermediate record to create hierarchy relationship between instances of Module identifiers |
| 422 | Target | Contains information used to identify Agent identifier |
| 424 | ASN1 Text File | Contains information of RFC file which defines the MIB module identifier |
| 428 | Index | Contains index information of MIB Object identifier |

TABLE 1-continued

| NO. | NAME | DESCRIPTION |
| --- | --- | --- |
| 430 | Device Object | Intermediate record to create many-to-many relationship between Device and MIB Object identifiers |
| 432 | Device | Contains (hardware) device information e.g. Concentration, Router, Bridge . . . |
| 434 | Vendor | Contains vendor information e.g. SynOptics, Cisco . . . |
| 436 | Group Object | Intermediate record to create many-to-many relationship between Group and MIB Object identifiers |

The agent identifier for a given agent is linked to the agent identifier of the sub-agents of the given agent by pointers 426, to the target records corresponding to the given agent by pointers 456, to the module identifiers corresponding to the given agent by pointers 212 through intermediate records in Agent Modules 405, to descriptions corresponding to the given agent by pointers 218, to objects corresponding to the given agent by pointers 468 through intermediate records in Identify Object 404, and to groups corresponding to the agent by pointers 214 through intermediate records Agent Device Group 410.

The module identifier for a given MIB is linked to the agent identifiers 202 which correspond to the given MIB by pointers 212 through intermediate records in Agent Module 405, to other module identifiers representing MIBs required by the given MIB by pointers 460 through intermediate records in Required Module 420, to module identifiers which represent MIBs which require the given MIB by pointers 458 through intermediate records in Required Module 420, to the syntax types corresponding to the given MIB by pointers 407 through intermediate records in Module Syntax Type 418, to objects corresponding to the given object through pointers 216, records in intermediate module object 402 and pointers 472, to descriptions corresponding to the given MIB through pointers 220, and to traps corresponding to the given MIB by pointers 466 through intermediate records in Module Trap 406.

The MIB object identifier which identifies a given MIB object is linked to enumerations corresponding to the given MIB object by pointers 230, to the module identifiers of MIBs corresponding to the given MIB object by pointers 216 through intermediate records in Module Object 402, to descriptions corresponding to the given MIB object through pointers 226, to agent identifiers which identify agents which support the given MIB object by pointers 438 through intermediate records in identify object 404 to group identifiers which identify groups which contain the given MIB object by pointers 224 through intermediate records Group Object 436, to other MIB object identifiers which represent MIB objects which are variations of the given MIB object by pointers 222, to devices which correspond to the given MIB object by pointers 442 through intermediate records in Device Object 430, and to the indexes corresponding to the given MIB object through pointers 440.

The group identifier of group identifiers 208 which represents a given group is linked to the MIB object identifiers which identify objects in the given group by pointers 224 through intermediate record 436, and to agents corresponding to the group by pointers 214 through intermediate records in Agent Device Group 410.

The trap record of Trap Records 408 which represents a given trap is linked to the module identifiers of Module Identifiers 204 which represent MIBs corresponding to the trap by pointers 472 through intermediate records in Module Trap 406, and to the MIB object identifiers of MIB Object Identifiers 206 which represent MIB objects which correspond to the given trap by pointers 454 through intermediate records in Group Object 436.

The formula record of Formula Records 412 which represents a given formula is linked to the MIB object identifiers of MIB Object Identifiers 206 which represent objects corresponding to the given formula by pointers 470 through intermediate records in group object 436, and to the agent identifiers of agent identifiers 202 which represent agents corresponding to the given formula by pointers 452 through intermediate records in Agent Device Group 410.

The syntax type record of Syntax Type records 416 which represents a given syntax type is linked to the module identifiers of Module Identifiers 204 which represent MIBs corresponding to the given syntax type by pointers 462 through intermediate records in Module Syntax Type 418, and to the enumeration records of enumeration records 400 which correspond to the given syntax type through pointers 230.

The vendor record of Vendor records 434 representing a given vendor is linked to the Device records of device records 432 which represent devices corresponding to the given vendor by pointers 446 through intermediate records in Vendor Device 414.

The device record of Device records 432 which represents a given device is linked to the vendor records of Vendor records 434 which represent vendors corresponding to the given device by pointers 448 through intermediate records in Vendor Device 414, to the MIB object identifiers of MIB object identifiers 206 which represent MIB objects corresponding to the given device by pointers 448 and pointers 444 through intermediate records in Device Object 430 and Vendor Device 414, and to the group records of group records 208 which represent groups corresponding to the given device by pointers 448 and pointers 450 through intermediate records in Vendor Device 414 and Agent Device Group 410.

The ANSI text file record of ANSI Text File records 424 which represents a given ANSI text file is linked to the module identifiers in Module Identifiers 204 which represent MIBs defined in the given ANSI text file by pointers 464.

In the foregoing discussion, it was assumed that agent identification unit 114, information retrieval unit 116, display mechanism 120, NMS application unit 118, database access unit 122 and import unit 126 were separate circuits or processors programmed to perform the functions prescribed to these units. While network management station 100 may be implemented using multiple processors in this fashion, network management station 100 may alternatively be implemented using a single circuit or processor programmed to execute programs corresponding to each of the described units.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. An apparatus for acquiring a plurality of values from an agent on a network, said plurality of values corresponding to a plurality of selected attributes of a device on which said agent is running, said agent being an agent of a given type, the apparatus comprising:

a storage device that has stored thereon a plurality of agent identifiers, each of said plurality of agent identifiers corresponding to a particular type of agent, a plurality of management information base object identifiers, and a plurality of agent-to-object pointers connecting said plurality of agent identifiers to said plurality of management information base object identifiers;

a database access unit coupled to said storage device, said database access unit receiving an agent signal indicative of the type of said agent, said database access unit receiving a selected attribute signal indicative of said plurality of selected attributes, said database access unit selecting a selected plurality of management information base object identifiers of said plurality of management information base object identifiers responsive to said agent signal, said selected attribute signal and said plurality of agent-to-object pointers, said selected plurality of management information base object identifiers corresponding to a plurality of objects associated with said plurality of selected attributes, said database access unit generating an object identification signal indicative of said selected plurality of management information base object identifiers; and an information retrieval unit coupled to said database access unit, said information retrieval unit receiving said object identification signal from said database access unit, said information retrieval unit transmitting an information request over said network to said agent responsive to said object identification signal, said information retrieval unit receiving a response to said information request over said network from said agent, said response including data indicative of said plurality of values.

2. The apparatus of claim 1 wherein said database access unit selects said selected plurality of management information base object identifiers by accessing said storage device to determine a required agent identifier of said plurality of agent identifiers responsive to said agent signal, said required agent identifier representing said agent, said database access unit following a selected plurality of pointers of said plurality of agent-to-object pointers from said required agent identifier to said selected plurality of management information base object identifiers, said selected plurality of pointers being selected responsive to said selected attribute signal.

3. The apparatus of claim 1 further including an agent identification unit coupled to said database access unit, said agent identification unit receiving a required agent identification signal that identifies said agent, said agent identification unit determining the type of said agent and generating said agent signal in response to said required agent identification signal.

4. The apparatus of claim 3 wherein said agent identification unit transmits a series of queries to said agent over said network in response to said required agent identification signal, said agent identification unit receiving a series of responses to said series of queries from said agent over said network, said agent identification unit determining the type of said agent based on said series of responses.

5. The apparatus of claim 1 further including a display mechanism coupled to said information retrieval unit, said information retrieval unit transmitting a value signal indicative of said plurality of values to said display mechanism, said display mechanism generating a visual representation of said plurality of values.

6. The apparatus of claim 5 wherein said storage device further stores a plurality of syntax identifiers and a plurality of object-to-syntax pointers, said plurality of object-to-syntax pointers connecting each management information base object identifier of said plurality of management information base object identifiers to a corresponding syntax identifier of said plurality of syntax identifiers.

7. The apparatus of claim 6 wherein said database access unit selects a selected plurality of syntax identifiers of said plurality of syntax identifiers responsive to said plurality of object-to-syntax pointers, said selected plurality of syntax identifiers corresponding to said selected plurality of management information base object identifiers.

8. The apparatus of claim 7 wherein said database access unit generates a syntax signal indicative of said selected plurality of syntax identifiers.

9. The apparatus of claim 8 wherein said display mechanism is coupled to said database access unit, said display mechanism receiving said syntax signal from said database access unit, said display mechanism generating said visual representation responsive to said syntax signal.

10. The apparatus of claim 5 wherein said visual representation comprises a pop-up window.

11. The apparatus of claim 5 wherein said visual representation includes a visual indication of a derived value, said display mechanism calculating said derived value based on at least one value of said plurality of values.

12. The apparatus of claim 11 wherein said display mechanism calculates said derived value responsive to a formula configuration file.

13. The apparatus of claim 1 wherein said storage device stores a plurality of group identifiers, each group identifier of said plurality of group identifiers representing a predefined attribute category.

14. The apparatus of claim 13 wherein said plurality of agent-to-object pointers includes a set of agent-to-group pointers and a set of group-to-object pointers, said set of agent-to-group pointers connecting said plurality of agent identifiers to said plurality of group identifiers, said set of group-to-object pointers connecting said plurality of group identifiers to said plurality of management information base object identifiers, said set of agent-to-group pointers connecting each agent identifier of said plurality of agent identifiers to one or more corresponding group identifiers of said plurality of group identifiers, said set of group-to-object pointers connecting each group identifier of said plurality of group identifiers to a corresponding set of management information base object identifiers, each management information base object identifier in said corresponding set of management information base object identifiers of a given group identifier corresponding to said predefined attribute category represented by said given group identifier.

15. The apparatus of claim 14 wherein said selected attribute signal indicates said plurality of selected attributes by specifying a specified predefined attribute category.

16. The apparatus of claim 15 wherein said database access unit selects said selected plurality of management information base object identifiers by accessing said storage device to determine a required agent identifier of said plurality of agent identifiers responsive to said agent signal, said required agent identifier representing said agent, said database access unit following a selected pointer of said set of agent-to-group pointers from said required agent identifier to a selected group identifier of said plurality of group identifiers responsive to said agent signal, said selected group identifier corresponding to said specified predefined attribute category, said database access unit selecting said corresponding set of management information base object identifiers of said selected group identifier as said selected plurality of management information base object identifiers.

17. The apparatus of claim 5 further including an agent identification unit coupled to said display mechanism, said display mechanism being coupled to receive said selected attribute signal and a required agent identification signal from a network management station application unit, said required agent identification signal being indicative of said agent, said display mechanism transmitting said selected attribute signal to said database access unit and said required agent identification signal to said agent identification unit, said agent identification unit generating said agent signal in response to said required agent identification signal, said agent identification unit transmitting said agent signal to said database access unit through said display mechanism.

18. The apparatus of claim 13 further comprising an import unit coupled to said storage device, said import unit receiving an import script file, said import unit constructing a new identifier based on said import script file, said import unit storing said new identifier on said storage device.

19. The apparatus of claim 18 wherein said new identifier is either an agent identifier, a group identifier, or an management information base object identifier, said import unit adding said new identifier to said plurality of agent identifiers if said new identifier is an agent identifier, said import unit adding said new identifier to said plurality of group identifiers if said new identifier is a group identifier, said import unit adding said new identifier to said plurality of management information base object identifiers if said new identifier is an management information base object identifier.

20. The apparatus of claim 18 wherein said import script file is a user-modifiable text file.

21. A method for determining for which objects to request values from an agent, the agent having a particular agent type, the method comprising the computer-implemented steps of:

receiving input that indicates a plurality of attributes;

selecting an agent identifier record that corresponds to the particular agent type from a plurality of agent identifier records that correspond to a plurality of types of agents, the selected agent identifier record being connected to a plurality of management information base object identifier records by a plurality of agent-to-object pointers;

selecting a selected plurality of management information base object identifier records of said plurality of management information base object identifier records based on
said plurality of attributes, and
said plurality of agent-to-object pointers; and selecting the objects that correspond to said selected plurality of management information base object identifier records as the objects for which values are to be requested from said agent.

22. The method of claim 21 further comprising the step of determining the agent type of the agent by:

receiving input that identifies the agent;

transmitting a series of queries to said agent over a network;

receiving a series of responses to said series of queries from said agent over said network; and determining the type of said agent based on said series of responses.

23. A method for displaying to a user information about attributes of a device on a network, the method comprising the steps of receiving input that indicates a plurality of attributes;

determining which objects supported by an agent on said device correspond to said plurality of attributes;

transmitting a request to said agent for values that correspond to said objects;

receiving said values from said agent in response to said request;

generating information about attributes of said device based on said values;

selecting a selected plurality of management information base object identifier records that correspond to said objects from a plurality of plurality of management information base object identifier records that correspond to a plurality of objects, said plurality of management information base object identifier records being connected to a plurality of syntax identifier records by a plurality of object-to-syntax pointers;

selecting a selected plurality of syntax identifier records from said plurality of syntax identifier records, said selected plurality of syntax identifier records being those syntax identifier records that are connected to said selected plurality of management information base object identifier records; and displaying said information about attributes of said device in a format that is based on syntax indicated by said selected plurality of syntax identifier records.

24. The method of claim 23 wherein:

said step of generating information about attributes of said device based on said values comprises the step of generating a derived value based on at least one of said values from said agent; and said step of displaying said information includes displaying said derived value.

25. A computer-readable medium for use in a network, the computer-readable medium having stored thereon a database that includes:

a plurality of agent records, each of said plurality of agent records corresponding to a particular type of agent;

a plurality of management information base object records, each of said plurality of management information base object records corresponding to a particular type of management information base object;

a plurality of group records, each group record of said plurality of group records representing a predefined attribute category;

a plurality of agent-to-object pointers connecting said plurality of agent records to said plurality of management information base object records, said plurality of agent-to-object pointers including a set of agent-to-group pointers and a set of group-to-object pointers;

said set of agent-to-group pointers connecting said plurality of agent records to said plurality of group records, and each agent record of said plurality of agent records to one or more corresponding group records of said plurality of group records; and said set of group-to-object pointers connecting said plurality of group records to said plurality of management information base object records, and each group record of said plurality of group records to a corresponding set of management information base object records of a given group record corresponding to said predefined attribute category represented by said given group record.

* * * * *